UNITED STATES PATENT OFFICE.

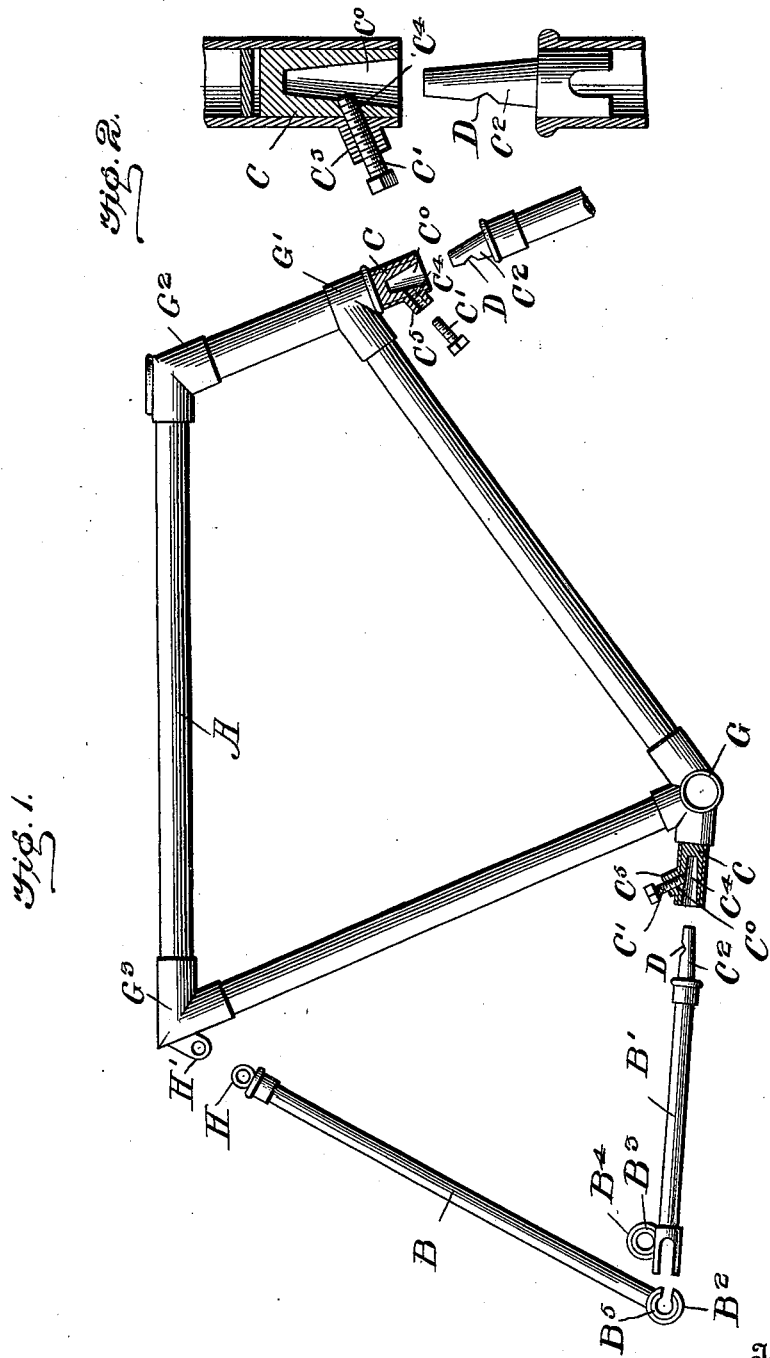

JAMES HAROLD BARRY, OF LONDON, ENGLAND.

JOINT FOR DETACHABLE BICYCLE-FRAMES.

SPECIFICATION forming part of Letters Patent No. 675,765, dated June 4, 1901.

Application filed May 23, 1900. Serial No. 17,708. (No model.)

*To all whom it may concern:*

Be it known that I, JAMES HAROLD BARRY, a subject of the British Queen, residing at Basinghall street, in the city of London, England, have invented certain new and useful Improvements in Joints for Detachable Bicycle-Frames; and I do hereby declare the following to be a full, clear, and exact description of the invention, such as will enable others skilled in the art to which it appertains to make and use the same.

My invention relates to improvements in detachable bicycle-frames, and especially provides for a peculiar style of joint, whereby when the parts are put together the necessary rigidity of the joint is secured.

Referring to the drawings, in which like letters refer to corresponding parts, Figure 1 is a side elevation of the frame, partly in section and showing various parts detached from the frame proper; and Fig. 2 is a longitudinal section through the joint, showing the socket and plug members detached.

A represents the main frame of the bicycle, B the detachable rear stay, and B' the detachable chain-stay.

I prefer to connect the rear stay and chain-stay together by means of the circular slip-joint illustrated in Fig. 1. To this end I provide the lower end of the backstay B with the enlargement or plate $B^2$, having a circular recess or hollow portion $B^5$, and on the rear end of the chain-stay I provide a similar enlargement or plate $B^3$, provided with the raised circular ring $B^4$. The ring $B^4$ is adapted to fit in the recess $B^5$ and when pressed into position by a screw prevents the joint from becoming unlocked until the screw is loosened sufficiently to press the part of the joint sidewise and outward.

To the crank-hanger G and the steering-rod, mounted in the bearing-heads G' $G^2$, I rigidly secure the socket-piece C, provided with the tapering or cone-shaped recess $C^0$ and the angularly-disposed aperture $C^4$.

At a point on the tubing alining with the aperture $C^4$ is formed a raised shoulder $C^5$, angularly disposed and interiorly screw-threaded to receive the set-screw C'.

The crown-head of the front forks and the chain-stay are provided with a tapering or cone-shaped plug $C^2$, adapted to fit the tapering recess $C^0$ of the socket-piece C, and this tapering plug has the substantially V-shaped recess D cut therein to receive the thrust of the set-screw C' when the joint is put together, and thereby force the plug up into the socket-piece and hold the same rigidly therein.

It is obvious that the style of joint could be used for connecting the backstay B with the saddle-post $G^3$ instead of the joint shown at H H'.

Having thus described my invention, what I claim, and desire to secure by Letters Patent of the United States, is—

In a detachable bicycle-frame, the combination with an interiorly hollow tapered socket-piece rigidly secured to the frame proper, an angularly-disposed aperture in the side of the said socket-piece, an angularly-disposed shoulder formed integral with the outer tubing, interiorly screw-threaded to aline with the aperture in the side of said socket-piece, a tapered plug having a substantially V-shaped recessed portion adapted to be inserted in said socket-piece, and an angularly-disposed and inwardly-pointed set-screw mounted in said shoulder, obliquely engaging with the recessed portion of said tapered plug, whereby the thrust of the screw forces the plug into the socket, thereby making a tight joint, substantially as described.

In testimony whereof I affix my signature in presence of two witnesses.

JAMES HAROLD BARRY.

Witnesses:
   F. G. PATERNOSTER,
   GEO. P. S. KELSEY.